Sept. 11, 1951  E. W. PARKER  2,567,445
METHOD OF MEASURING THE pH OF AQUEOUS LIQUIDS,
MOIST FOODSTUFFS, AND THE LIKE
Filed Aug. 21, 1946
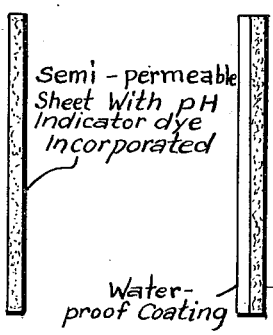
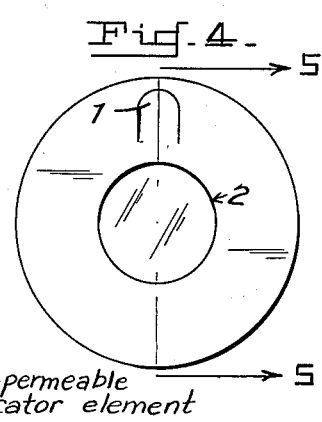
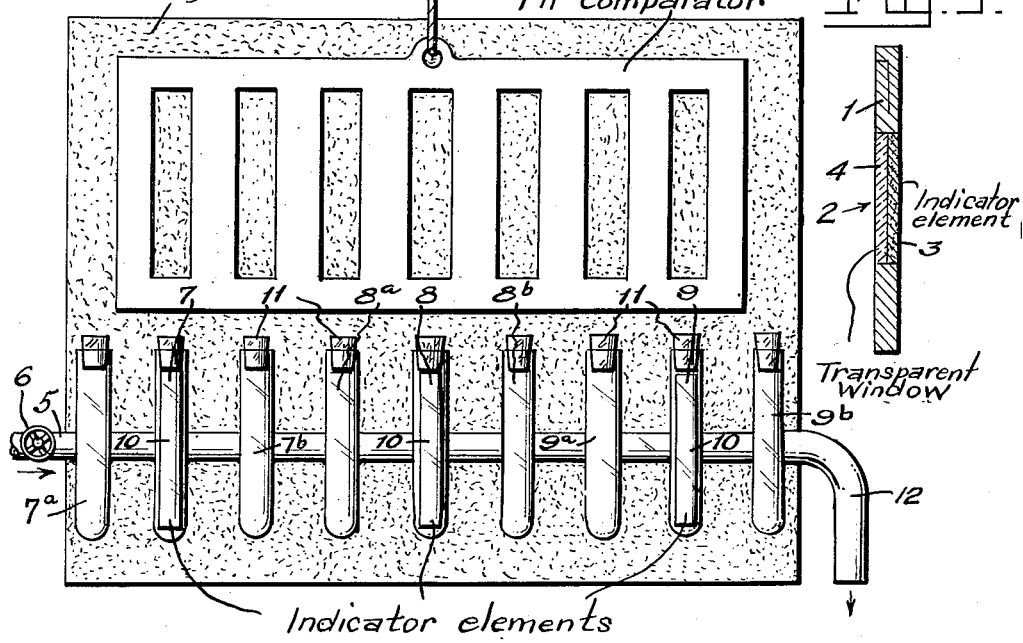
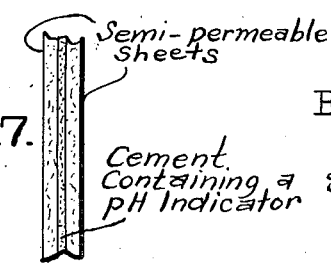
Inventor
Elizabeth W. Parker
By Henry C. Parker
Attorney Patented Sept. 11, 1951

2,567,445

UNITED STATES PATENT OFFICE 2,567,445

METHOD OF MEASURING THE pH OF AQUEOUS LIQUIDS, MOIST FOODSTUFFS, AND THE LIKE

Elizabeth W. Parker, Washington, D. C.

Application August 21, 1946, Serial No. 692,113

2 Claims. (Cl. 23—230)

This invention relates to manufacture of pH-sensitive materials and making measurements therewith; and it comprises a method of making plastic elements in the form of semi-permeable films, pellicles, sheets, or the like, which contain a pH indicator dye incorporated therein; said method involving the steps of mixing a pH indicator dye with a spinning solution or a moldable mass of a transparent, hydrophilic plastic which is semi-permeable when formed, and then forming said solution or mass into the desired shape. The invention also includes the pH sensitive formed plastic semi-permeable bodies produced by the said process. In addition the invention comprises a continuous method of measuring pH wherein the described semi-permeable body of plastic is contacted with a material whose pH is to be measured and permitted to remain in contact therewith at least until the color of said dye indicates the pH of said material; all as more fully hereinafter set forth and as claimed.

In the prior art various methods have been proposed for measuring pH by means of color indicators. The common method involves adding a few drops of a solution of an indicator to a portion of the liquid whose pH is to be measured and comparing the color produced with a set of standards. Papers impregnated with pH indicators have also been used, these papers being usually dipped into the liquid to be measured or a drop of the liquid being applied to the paper. No feasible way of making continuous pH readings by means of indicators has been developed, however, which has not involved an uneconomic waste of indicator. Thus, while suitable electrometric methods of making continuous pH measurements of flowing liquids are known, this is not true in the case of color indicators.

I have discovered that color indicator dyes can be readily incorporated into semi-permeable plastic materials and that, owing to the large sizes of the dye molecules, the dyes are dissolved out only slowly even in flowing water. But owing to the rapid diffusion of hydrogen and hydroxyl ions through these semi-permeable materials the dyes quickly and continuously respond to the pH changes of a flowing liquor. The term "semipermeable" is used herein in its usual sense to designate a porous structure having pores so small that they substantially prevent diffusion therethrough of large molecules while permitting the passage of water as well as hydrogen and hydroxyl ions. The loss of dye due to diffusion through the semi-permeable material is small and this loss can be controlled by the thickness of the plastic and/or by controlling the size of its pores. Of course the thicker the plastic element in which the dye is incorporated and the less its porosity, the slower its response to pH change, but in most cases of continuous measurement a short time lag is not objectionable. This time lag can be reduced by passing the liquor, whose pH is being measured, rapidly past the plastic element. The speed of flow of this liquor has but little effect upon the rate of diffusion of the dye through the plastic. When the bulk of the dye has been lost by diffusion it is only necessary to replace the plastic with a fresh indicator element, which requires a minimum of time and but little skill. It is possible to balance the factors of time lag against the cost of the indicator element to obtain results which are satisfactory for most purposes. With the aid of a recording colorimeter and controller it is even possible to control automatically the pH of the liquor which is being measured, using my new indicator elements.

In making my pH-sensitive plastic elements any of the usual pH indicator dyes can be employed which are stable under the particular conditions required to form the plastic into the desired shape. In the case of regenerated cellulose, for example, the spinning solutions used are rather highly alkaline while the spinning bath is acid, so the indicator to be incorporated must be able to withstand these conditions. In the case of cellulose derivatives, such as cellulose esters and ethers, nitrocellulose etc. my indicator elements can be produced by dissolving these derivatives in an organic solvent, mixing in the dye, and then forming in conventional manner; hence these plastics can be used for making my indicator elements from any type of indicator dye which is inert towards the organic solvent and which has a stability sufficient for ordinary pH measurements.

Methods of incorporating dyes of various types in spinning solutions are well known in the art. These prior methods have been used heretofore for dying plastics and, of course, in the selection of the dyes to be used, stability of color under all conditions has been a prime requisite. Indicator dyes, in contrast, are notably unstable toward acids and bases. But the mechanical methods which have been employed heretofore for incorporating the stable dyes in plastics are likewise useful in the case of the unstable indicator dyes. Methods are also known whereby formed plastic articles can be dyed by contacting them with dye baths containing certain stable dyes. These methods, however, are not generally suitable in the case of my indicator element for the reason that all color indicator dyes are at least somewhat soluble in water and, if the dye penetrates into the plastic when the latter is placed in a dye bath, it will leach therefrom just as rapidly. It is possible, however, to modify this method by dyeing a formed plastic with an indicator dye while in a gel or permeable form and to follow this with a treatment which reduces the size of the pores, rendering the plastic semi-permeable, i. e. permeable to the hydroxyl and hydrogen ions but not to the dye molecules.

In selecting the plastics to be used a wide range is available, since any plastic can be employed which can be dissolved or sufficiently plasticized to be thoroughly mixed with the indicator dye and then formed into the desired shape in a state which is insoluble in the liquor whose pH is to be measured and which is semi-permeable, with pores sufficiently small as to substantially hinder diffusion of the dye molecules. Methods are known whereby satisfactory semi-permeable products can be produced from most of the well-known plastics. Hydrophylic colloidal plastics as a group can be employed. These include re-generated cellulose, cellulose hydrate, alkali-soluble cellulose esters, hydrophilic cellulose ethers, mixed ester-ethers of cellulose, gelatine, casein, de-acetylated chitin, hydrophylic artificial resins, alkyl cellulose ethers, hydroxy-alkyl ethers, carboxy-alkyl ethers, low-nitrated cellulose nitrate, low esterified cellulose acetate and cellulose formate, cellulose ether xanthates etc. Water-swelling polymers of acrylic acid, urea-formaldehyde resins, methyl-methacrylates, polyvinyl alcohol resins in the "A" stage and other hydrophylic synthetic resins can also be used.

Cellulose hydrate indicator elements can be made, for example, from solutions of viscose or cuprammonium cellulose in which the indicator dye has been dissolved or dispersed followed by forming in the usual setting or coagulating baths. Cellulose ester indicator elements can be made by dissolving a hydrophylic organic solvent-soluble cellulose ester in an organic solvent, mixing the indicator dye therewith and spinning the mixture either in a controlled atmosphere or in a coagulating bath by methods well known in the art. Cellulose ether indicator elements can be made from alkali-soluble, water-insoluble cellulose ethers by mixing the indicator with an alkaline solution of such an ether and then forming in a suitable aqueous setting bath. Indicator elements can be made from proteins, such as gelatine or casein, by mixing the dyes in solutions of these materials, forming into films or fibers and then hardening and insolubilizing, for example by the use of a formaldehyde solution. Suitable raw materials for the production of my elements can be produced by the de-esterification of cellulose esters, for example, by the de-nitration of a high viscosity nitrocellulose. The final products can be impregnated to reduce their permeability, if desired, either with insoluble inorganic salts precipitated in situ or with colloidal matter.

While any of the usual indicator dyes can be used in my invention, those which are particularly suitable for detecting pH changes in the neighborhood of the neutral point are Methyl Red, Bromthymol Blue, Para-Nitrophenol, Dinitrophenol, Phenolphthalein, Meta Nitrophenol, Chlorphenol Red, Benzo Red, Meta-cresol Purple, Benzo Yellow and Brom Cresol Green. Even litmus can be used if desired.

While the invention is applicable to the continuous measurement of flowing liquors, one of the most important applications thereof is in the making of containers for perishable foodstuffs which will change color due to pH change upon the fermentation or decomposition of the foodstuffs. It is, of course, well known that most perishables emit carbon dioxide and other acrid vapors upon fermentation and decomposition. Most foods themselves also become increasingly acid. It is therefore possible to use as a wrapping for such foods a sheet of hydrophylic material in which there has been incorporated a pH indicator having the property of changing in color when contacted with acrid vapors or foodstuffs. If it is desired to use a water-proof wrapper which is nevertheless capable of indicating a change in pH, this can be accomplished by coating one side only of the described sheet with a water-impermeable coating, such as a wax or an artificial resin or varnish. One side can be coated with a glyptal resin, for example, or with a rubber chloride coating etc. The uncoated side is then placed next to the foodstuff and the wrapper will indicate change in pH but will prevent the diffusion of moisture. Of course a separate outer impermeable wrapping can be used for the same purpose.

In the case of milk, it is possible to use a milk bottle cap or a window therein composed of one of my indicator elements in which a dye, such as Brom Cresol Purple is incorporated. This cap or window will normally be colored a gray-blue color while the milk is fresh but, upon fermentation of the milk, a yellow color of increasing brightness, according to the acidity, will be produced. A cellophane wrapper for frozen fish or oysters, for example, impregnated with Bromthymol Blue, will normally have a blue or green color but, upon spoilage, the color will turn to yellow. If Methyl Red is substituted for the Bromthymol Blue, the color of some products will change from yellow to red upon spoilage. Such wrappers are of particular importance in the wrapping of frozen foods since, unless these packages are all dated, they are liable to be left in food lockers for months at a time. Prior to the present invention there was no easy way of telling whether such packages were still fit for use without opening them. But when packages are wrapped with one of my indicator sheets, a quick glance is sufficient to detect any which have deteriorated.

My invention can be explained more specifically by reference to the accompanying drawing which shows, more or less diagrammatically, several embodiments of my indicator elements and apparatus useful in conducting my process. In this showing:

Fig. 1 is an elevation of an indicator strip suitable for use in the continuous measurement of pH, Fig. 2 is a side view of the indicator strip of Fig. 1, Fig. 3 is a partial side view of an indicator sheet which can be used for wrapping perishables, for example, Fig. 4 is an elevation of a milk bottle cap provided with a pH indicator element, in accordance with this invention, Fig. 5 is a section through the cap of Fig. 3, taken along the line 5—5 of this figure, Fig. 6 shows an apparatus for continuously measuring the pH of a flowing liquor by my method, while Fig. 7 is a side or end view of a modified indicator element.

The legends on the various figures are believed to make them self-explanatory. Figs. 1 and 2 show elevational and side views, respectively, of an indicator element which can be used for general pH measurements, or for measuring continuously the pH of a flowing solution, as shown in Fig. 6. This is merely a small strip of semipermeable plastic, such as cellophane, with an indicator dye incorporated therein. The dimensions of this strip may be, for example, about 5 x 1 centimeters by 0.25-1 mm. thick. For titration or other work, where it is desired to obtain rapid measurements, of pH it is possible to make my indicator elements of film thickness, that is, 0.1 mm. or less in thickness. Of course, the less the thickness of my indicator elements, the more dye has to be incorporated to produce a distinguishable color. But, since my elements can be made containing up to about 30 per cent of indicator dye, this does not seriously limit the dimensions of my elements. The most serious limitation is the mechanical strength of the elements. When too thin these elements tend to ball up in the liquid, so it is desirable to make them with sufficient mechanical strength to resist agglomeration when immersed in an agitated liquid. This means that the minimum thickness for these small indicator elements is about 0.1 to 0.2 mm.

In Fig. 3 a partial end view is shown of a modified indicator element, in the form of a wrapping sheet for frozen meat or vegetables, for example. A semi-permeable sheet with indicator dye incorporated is used. One face of this sheet is coated with a transparent water-proofing material, such as a vinyl or glyptal resin to make the finished sheet.

The milk bottle cap of Fig. 4 may be provided with the usual pull up tab 1 and an indicator disc shown generally at 2. The latter, as shown in Fig. 5, may be laminated, with an inner film 2 of semi-permeable material in which an indicator dye has been incorporated and an outer sheet 4 of transparent material which, if desired, may be water-proof.

An apparatus for making continuous pH measurements is shown in Fig. 6. The liquor to be measured is introduced through the pipe 5, its rate of flow being controlled by the valve 6. It passes seratim through a series of measuring tubes 7, 8 and 9 in which are placed indicator elements 10 of the general type shown in Figs. 1 and 2. The tubes 7a, 7b, 8a, 8b, 9a and 9b are blanks which are opened only to vent air or for cleaning purposes and are used to compensate for the color of the liquor whose pH is being measured. The tubes are closed at their tops by means of stoppers 11. They may be constructed of glass or any transparent plastic material. The liquor is discharged through the pipe 12. It will be noted that, owing to the semi-permeable nature of the plastic of the indicator elements, the liquor whose pH is measured is substantially free from any dye contamination and therefore can be united with the main body of liquor. This is an important advantage of my invention.

In the making of measurements with the device of Fig. 6, it is convenient to make color comparison using a comparator shown generally at 15, having color standards mounted therein in windows 16, every other window containing a tube of distilled water, used as a blank. The comparator may be conveniently mounted by a cord and can be pulled down so that the color standards fall in line with the tubes of the testing device. The latter is conveniently mounted in front of a ground glass 17. The comparison is then conducted in the usual manner. One of the blanks of the comparator is placed opposite the indicator tube 8, with tubes 8a and 8b opposite windows containing the test standards. The comparator is moved along until the combined color of the central tubes is intermediate that on either side. It is to be noted that in this manner compensation is made for any color of turbidity in the flowing liquor whose pH is measured. In this device it is important that the indicator elements fit the measuring tubes closely and have sufficient mechanical strength to remain upright. If desired the tubes can be molded from plastic to closely fit the indicator elements. It is also possible to mount the comparator on a slide just back of the testing tubes, the slide being sufficiently long so that readings can be taken on any of the measuring tubes 7, 8 or 9.

The measuring tubes 7 and 9 contain indicator elements and are useful for the following reasons. As the indicator dye gradually diffuses from the elements the color loses in intensity. The quality or shade of color is not affected but pH readings are more accurate when the color intensity of the unknown is approximately equal to that of the standards. In the device indicated the color intensity of the indicator elements can be controlled in such manner that the central element will have approximately the correct intensity. This may be accomplished by providing indicator elements which, when fresh, have a color intensity which is slightly greater than that of the color standards. The indicator elements can be changed one at a time, the exhausted element being removed from one end of the chain and a fresh one introduced at the opposite end, the two remaining elements being moved along the line. If the indicator elements are changed in this fashion, at the time that the last one previously introduced corresponds in color intensity to that of the color standards, the central element will give the most accurate readings while at one side there will be an element having too great an intensity and at the other side one with a lower intensity than that of the standards. If desired, it is possible quickly to check all three indicator elements against the standards and thus to obtain a highly accurate reading.

It is evident that my new method enables an accurate pH reading to be taken with a minimum of effort and time and without the necessity of taking samples, dropping an indicator solution in the samples, placing the samples in a comparator etc. The latter manipulations always require a certain degree of skill and are usually considered as requiring the services of a chemist. With the device of the present invention, it might require the services of a chemist to change the indicator elements, but this would not be required in general more often than once in 24 hours. Inbetween readings could be taken by any unskilled laborer merely by matching the color.

In Fig. 7 a modified indicator element is shown. This is formed of two outer semi-permeable plastic sheets cemented together with a waterproof cement and with a pH indicator dye incorporated between the sheets. This element can be formed conveniently by mixing the dye with the cement, which may be a nitrocellulose cement, for example and then using the cement to stick the sheets together. If desired an opaque material, such as titanium dioxide or whiting, can be mixed in the cement. This forms a white background for viewing the color.

The following specific examples represent embodiments of methods which can be used in producing the indicator elements of this invention.

*Example 1*

A solution of gelatine having a concentration of from about 5 to 10 per cent gelatine is heated and mixed with 0.1 per cent by weight of Methyl Red, based on the gelatine. This mixture is poured on a glass plate and allowed to set in a thin film. The film is stripped from the plate and insolubilized by exposing it to formaldehyde vapors. The resulting film is substantially insoluble in water and yet is semi-permeable, the dye dissolving out of the film very slowly. But strips of the film when placed in buffer solutions or other liquors quickly assume a color corresponding to the pH of these liquids.

*Example 2*

A 10 per cent solution of cellulose acetate in acetic acid is mixed with 0.25 per cent of Meta-Cresol Purple, based on the weight of the cellulose acetate. This mixture is poured into excess of water to precipitate the cellulose acetate. The precipitate is then washed and dried. The resulting powder can be made into a molding powder from which my indicator elements can be molded, by an injection molding process, for example, or dissolved in acetone to produce a spinning solution which is then spun or formed in conventional manner in an aqueous-bath into sheets. The sheeted product produced by this method can be punched to form indicator discs and used in milk bottle caps, as shown in Figs. 4 and 5.

*Example 3*

A spinning solution of sodium cellulose-xanthogenate is mixed with Bromthymol Blue in the proportions of about 0.01 per cent of the latter based on the weight of the spun product. This is formed into strips by passing through a spinnerette into a coagulation bath containing sulfuric acid of 18° Bé. held at a temperature of 44° C. The strips are after-treated in an alkaline bath, rinsed and finished.

*Example 4*

A cellulose acetate spinning dope containing 25 parts of cellulose acetate dissolved in 75 parts by weight of acetone is mixed with Chlorphenol Red in the amount of 0.02 per cent by weight of the latter, based on the acetate. This mixture is spun into strips, the solvent being evaporated in a stream of warm air.

*Example 5*

A de-nitrated nitrocellulose spinning dope containing about 20 per cent of the nitrocellulose dissolved in ethyl acetate is mixed with 0.05 per cent of Benzo Red, based on the weight of the nitrocellulose. This dope is poured on a glass plate to form a film, dried and then stripped and cut into strips.

While I have described what I consider to be the most advantageous embodiments of my process and indicator elements, it is evident, of course, that many modifications can be made in the specific procedures and structures which have been described without departing from the purview of this invention. The examples which have been given are believed sufficient to teach those skilled in the art how to produce my indicator elements. The latter can be made in any desired form, such as filaments, strips, sheets etc. My indicator elements are particularly useful in measuring the pH of opaque liquids, such as milk, for the reason that the liquid can be shaken or wiped from the strips after immersion therein and then the strips can be checked against standards. This cannot be done with indicator papers, for example. The indicator dye can be incorporated in the plastic by various methods. My strips can be made with a large range of dye concentrations and, as indicated previously, it is desirable to have the dye concentration vary inversely with the thickness of the strips since it is difficult to see through a thick strip having a high concentration of dye. Of course such strips can be viewed by reflected light but this method is not usually as satisfactory as the usual method of viewing them by transmitted light. I prefer to make my strips of about the same color intensity as the usual color standards used in pH colorimetric measurements, so that these standards can be used for comparison purposes. But it is possible to make strips containing all the way from about 0.005 to 20 per cent of dye, if desired. The dye concentration (depth of color) can be lowered by soaking the indicator elements in distilled water or a buffer solution. For strips to be viewed by reflected light it is sometimes advantageous to incorporate therein some type of white opaque pigment, such as titanium dioxide. This forms strips suitable to be viewed by reflected light since the titanium dioxide furnishes a white background for the dye. Any type of color standards can be used with my strips for comparison purposes. Thus it is possible to use the conventional liquid standards formed of buffer solutions sealed in glass tubes, but it is equally possible to employ colored glass strips which are available for some pH indicators. The wedge type of color standards can also be employed. It is possible, of course, to have milk bottle caps formed entirely from one of my indicator plastics, rather than to have merely a window of this material, as shown in Figs. 4 and 5. Other modifications of my invention which fall within the scope of the following claims will be immediately evident to those skilled in this art.

What I claim is:

1. The process of measuring the pH of aqueous liquids, moist foodstuffs and the like, which comprises holding in direct contact with a moist material whose pH is to be measured a thin body of transparent, semi-permeable, hydrophilic, water-insoluble colloidal plastic having uniformly incorporated in the body thereof a pH indicator dye in a concentration within the range of from about 0.005 to 20 per cent by weight; said dye changing color due to pH change over a range of pH including the pH of the material whose pH is to be measured; said body of plastic being sufficiently thin to respond quickly to changes of pH when contacted with said material and sufficiently porous to be permeable to hydrogen and hydroxyl ions but having pores sufficiently small substantially to hinder diffusion of the dye molecules; and comparing the color of said plastic body with pH color standards after it has been held in contact with said material for a time sufficient to assume a color corresponding to the pH of said material.

2. The process of measuring the pH of a flowing liquid which comprises immersing in the flowing liquid a thin body of transparent, semipermeable, hydrophilic, water-insoluble colloidal plastic having uniformly incorporated in the body thereof a pH indicator dye in a concentration within the range of from about 0.005 to 20 per cent by weight; said dye changing color due to pH change over a range of pH including the pH of the material whose pH is to be measured; said body of plastic being sufficiently thin to respond quickly to changes of pH when contacted with said liquid and sufficiently porous to be permeable to hydrogen and hydroxyl ions but having pores sufficiently small substantially to hinder diffusion of the dye molecules; and comparing the color assumed by said plastic body with pH color standards.

ELIZABETH W. PARKER.

REFERENCES CITED

The following references are of record in the file of this patent:

UNITED STATES PATENTS

| Number | Name | Date |
| --- | --- | --- |
| 1,238,123 | Freeman | Aug. 28, 1917 |
| 1,538,277 | Dula | May 19, 1925 |
| 1,831,894 | Truog | Nov. 17, 1931 |
| 1,936,312 | Snyder | Nov. 21, 1933 |
| 2,038,298 | Kiernan | Apr. 21, 1936 |
| 2,046,267 | Johnson | June 30, 1936 |
| 2,063,245 | Haeseler | Dec. 8, 1936 |
| 2,099,341 | Kenyon | Nov. 16, 1937 |
| 2,115,318 | Rosen | Apr. 26, 1938 |
| 2,128,338 | Whitehead | Aug. 30, 1938 |
| 2,129,406 | Cole | Sept. 6, 1938 |
| 2,156,880 | Sloman | May 2, 1939 |
| 2,182,964 | Dryfus | Dec. 12, 1939 |
| 2,214,354 | Snelling | Sept. 10, 1940 |
| 2,229,155 | Wenker | Jan. 21, 1941 |
| 2,249,867 | Snelling | July 22, 1941 |
| 2,250,980 | Workman | July 29, 1941 |
| 2,271,724 | Traylor | Feb. 3, 1942 |
| 2,313,076 | Klinkenstein | Mar. 9, 1943 |
| 2,411,012 | Wallach | Nov. 12, 1946 |
| 2,460,215 | Chase | Jan. 25, 1949 |
| 2,485,566 | Clark | Oct. 25, 1949 |

FOREIGN PATENTS

| Number | Country | Date |
| --- | --- | --- |
| 412,952 | Great Britain | July 5, 1943 |

OTHER REFERENCES

Handbook of Chemistry, Lange (5th ed.), Handbook Publishers Inc., Sandusky, Ohio, 1946 (page 1119).